(12) United States Patent
Kottilingal et al.

(10) Patent No.: US 9,779,471 B2
(45) Date of Patent: Oct. 3, 2017

(54) TRANSPARENT PIXEL FORMAT CONVERTER

(71) Applicant: QUALCOMM Incorporated, San Diego, CA (US)

(72) Inventors: Sudeep Ravi Kottilingal, San Diego, CA (US); Moinul Khan, San Diego, CA (US); Colin Christopher Sharp, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 14/504,047

(22) Filed: Oct. 1, 2014

(65) Prior Publication Data

US 2016/0098813 A1     Apr. 7, 2016

(51) Int. Cl.
    *G06T 1/60*      (2006.01)
    *G06F 12/109*    (2016.01)
    *G06T 1/20*      (2006.01)

(52) U.S. Cl.
    CPC .............. *G06T 1/60* (2013.01); *G06F 12/109* (2013.01); *G06T 1/20* (2013.01); *G06F 2212/657* (2013.01); *G06T 2200/28* (2013.01)

(58) Field of Classification Search
    CPC ....... G06T 1/60; G06T 2200/28; G06F 12/10; G06F 12/109; G06F 2212/657
    USPC ........................ 345/531, 545, 537
    See application file for complete search history.

(56) References Cited

U.S. PATENT DOCUMENTS 5,469,190 A * 11/1995 Masterson ............... G09G 5/02
                                                    345/540
6,172,669 B1 * 1/2001 Murphy ................. G09G 5/395
                                                    345/601
6,336,180 B1 * 1/2002 Long ..................... G06F 9/3879
                                                    711/206
7,155,236 B2 * 12/2006 Chen ................... H04W 52/286
                                                    370/230
7,688,384 B2    3/2010 Davis et al.
8,086,575 B2   12/2011 Putterman et al.
8,595,782 B2   11/2013 Sie et al.
(Continued)

FOREIGN PATENT DOCUMENTS

EP      0680013 A2    11/1995
EP      2515294 A2    10/2012

OTHER PUBLICATIONS

International Search Report and Written Opinion from International Application No. PCT/US2015/050465, dated Jan. 7, 2016, 11 pp.

(Continued)

*Primary Examiner* — Gregory J Tryder
*Assistant Examiner* — Michael Le
(74) *Attorney, Agent, or Firm* — Shumaker & Sieffert, P.A.

(57) ABSTRACT

A transparent format converter (TFC) may determine that a request by at least one processor for graphics data stored in graphics memory is indicative of a request for graphics data in a first data format. The TFC may retrieve the graphics data in a second data format from the graphics memory based at least in part on the request for the graphics data in the graphics memory. The TFC may convert the retrieved graphics data from the second data format to the first data format. The TFC may store the converted graphics data in the first data format into a memory that is accessible by the at least one processor.

14 Claims, 7 Drawing Sheets

(56) References Cited

U.S. PATENT DOCUMENTS

| | | | |
|---|---|---|---|
| 2009/0244074 A1* | 10/2009 | Montrym | G06T 1/60 |
| | | | 345/522 |
| 2010/0265259 A1 | 10/2010 | Faye-Lund et al. | |
| 2011/0126104 A1 | 5/2011 | Woods et al. | |
| 2012/0204015 A1* | 8/2012 | Misra | G06F 9/30025 |
| | | | 712/225 |
| 2012/0242671 A1* | 9/2012 | Wyatt | G09G 5/001 |
| | | | 345/520 |
| 2015/0084975 A1 | 3/2015 | Heinrich et al. | |
| 2015/0286467 A1 | 10/2015 | Khan et al. | |

OTHER PUBLICATIONS

Response to Written Opinion dated Jan. 7, 2016, from International Application No. PCT/US2015/050465, filed on Jul. 5, 2016, 5 pp.
International Preliminary Report on Patentability issued by the International Preliminary Examination Authority of the European Patent Organization in International Application No. PCT/US2015/050465 dated Jan. 18, 2017, 8 pp.
Second Written Opinion from International Application No. PCT/US2015/050465, dated Sep. 30, 2016, 6 pp.

\* cited by examiner

TRANSPARENT PIXEL FORMAT CONVERTER

TECHNICAL FIELD

This disclosure relates to a transparent pixel format converter.

BACKGROUND

Graphics data, such as a graphics image or frames of a video, may be made up of pixels. Pixel data, such as information regarding pixels of the graphics data, may be arranged according to a specified pixel format, which may define the number of bits of memory associated with a pixel of data, and which may also define the order of the color components within the pixel of data. Pixel data arranged according to a specified pixel format in memory may be compressed according to the pixel format and may also be arranged in memory locations of the memory according to the pixel format. Typically, pixel formats may be classified as linear pixel formats or tile-based pixel formats.

SUMMARY

In general, the present disclosure relates to a transparent format converter (TFC) that transparently converts between different pixel formats, such that the TFC may provide processing cores with a view of graphics data according to pixel formats supported by the processing cores, regardless of the underlying pixel format of the graphics data. The TFC may enable the processor cores to treat the graphics data as if the graphics data are arranged according to the pixel formats supported by the processor cores.

In one aspect, the present disclosure is directed to a method for pixel processing. The method may include determining, by a transparent format converter (TFC), that a request by at least one processor for data stored in a first data buffer is indicative of a request for the data in a first data format. The method may further include retrieving, by the TFC, the data in a second data format from the first data buffer based at least in part on the request for data stored in the first data buffer. The method may further include converting, by the TFC, the retrieved data from the second data format to the first data format. The method may further include storing, by the TFC, the converted data in the first data format into a second data buffer that is accessible by the at least one processor.

In another aspect, the present disclosure is directed to a computing device. The computing device may include a first data buffer. The computing device may further include a second data buffer. The computing device may further include at least one processor. The computing device may further include a transparent format converter configured to: determine that a request by the at least one processor for data stored in the first data buffer is indicative of a request for the data in a first data format; retrieve the data in a second data format from the first data buffer based at least in part on the request for data stored in the first data buffer; convert the retrieved data from the second data format to the first data format; and store the converted data in the first data format into the second data buffer that is accessible by the at least one processor.

In another aspect, the present disclosure is directed to an apparatus. The apparatus may include means for determining that a request by at least one processor for data stored in a first data buffer is indicative of a request for the data in a first data format. The apparatus may further include means for retrieving the data in a second data format from the first data buffer based at least in part on the request for data stored in the first data buffer. The apparatus may further include means for converting the retrieved data from the second data format to the first data format. The apparatus may further include means for storing the converted data in the first data format into a second data buffer that is accessible by the at least one processor.

In another aspect, the present disclosure is directed to a computer-readable medium containing instructions. The instructions cause a programmable processor to: determine, by a transparent format converter (TFC), that a request by at least one processor for data stored in a first data buffer is indicative of a request for the data in a first data format; retrieve, by the TFC, the data in a second data format from the first data buffer based at least in part on the request for data stored in the first data buffer; convert, by the TFC, the retrieved data from the second data format to the first data format; and store, by the TFC, the converted data in the first data format into a second data buffer that is accessible by the at least one processor.

The details of one or more aspects of the present disclosure are set forth in the accompanying drawings and the description below. Other features, objects, and advantages of the present disclosure will be apparent from the description and drawings, and from the claims.

DETAILED DESCRIPTION

In general, the present disclosure relates to a transparent format converter (TFC) that transparently converts between different pixel formats, such that the TFC may provide a view of pixel data. Pixel data may be stored in a variety of different pixel formats. Hardware designers may often create new, proprietary pixel formats that may be processed more efficiently by hardware cores designed by the hardware designers than well-known standardized pixel formats. For example, tile-based pixel formats may often be created for increased memory efficiency and efficient bandwidth utilization efficiency in lieu of linear pixel formats.

However, developers of software applications that manipulate pixel data may often implement support for only a few well-known pixel formats in lieu of implementing an exhaustive variety of pixel formats. In addition, the tile-based pixel formats created by hardware designers may often be proprietary, such that the software developers may not have knowledge of those tile-based pixel formats. In some examples, an operating system that such software applications run on may also not exhaustively support a wide variety of pixel formats. Because existing operating systems are often adapted to run on new hardware, it may not be possible for operating systems to continually support newly-created pixel formats implemented on such new hardware.

The TFC of this disclosure may be configured to transparently convert between pixel formats such that a processor that supports a first pixel format may view, through the TFC, pixel data arranged according a second format as if that pixel data was instead arranged according to the first pixel format supported by the processor. In accordance with aspects of the present disclosure, the TFC may be configured to determine that a request by at least one processor for data stored in a first data buffer is indicative of a request for the data in a first data format. The TFC may further be configured to retrieve the data in a second data format from the first data buffer based at least in part on the request for data stored in the first data buffer. The TFC may further be configured to convert the retrieved data from the second data format to the first data format. The TFC may further be configured to store the converted data in the first data format into a second data buffer that is accessible by the at least one processor.

Figure 1:
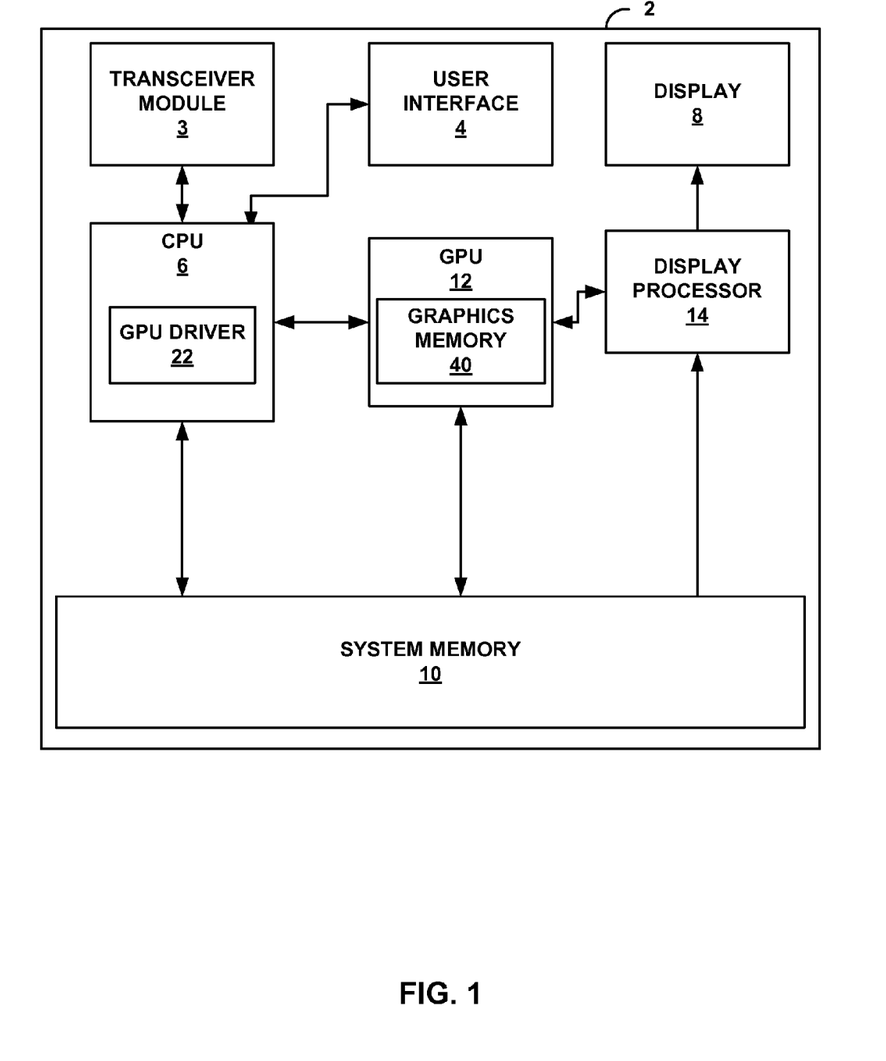
FIG. 1 is a block diagram illustrating an example computing device that may be configured to implement one or more aspects of this disclosure.

FIG. 1 is a block diagram illustrating an example computing device that may be configured to implement one or more aspects of this disclosure. As shown in FIG. 1, computing device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 1, computing device 2 may include central processing unit (CPU) 6, system memory 10, and GPU 12. Computing device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Computing device 2 may include additional modules or units not shown in FIG. 1 for purposes of clarity. For example, computing device 2 may include a speaker and a microphone, neither of which are shown in FIG. 1, to effectuate telephonic communications in examples where computing device 2 is a mobile wireless telephone, or a speaker where computing device 2 is a media player. Computing device 2 may also include a video camera. Furthermore, the various modules and units shown in computing device 2 may not be necessary in every example of computing device 2. For example, user interface 4 and display 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver module 3 may include circuitry to allow wireless or wired communication between computing device 2 and another device or a network. Transceiver module 3 may include modulators, demodulators, amplifiers and other such circuitry for wired or wireless communication.

Processor 6 may be a microprocessor, such as a central processing unit (CPU) configured to process instructions of a computer program for execution. Processor 6 may comprise a general-purpose or a special-purpose processor that controls operation of computing device 2. A user may provide input to computing device 2 to cause processor 6 to execute one or more software applications. The software applications that execute on processor 6 may include, for example, an operating system, a word processor application, an email application, a spreadsheet application, a media player application, a video game application, a graphical user interface application or another program. Additionally, processor 6 may execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

The software applications that execute on processor 6 may include one or more graphics rendering instructions that instruct processor 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™) or any other public or proprietary standard graphics API. In order to process the graphics rendering instructions, processor 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on processor 6 requires graphics processing, processor 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than processor 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using processor 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

Graphics memory 40 may be part of GPU 12. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and output values that cause the pixels of display 8 to illuminate to display the image. Display 8 may be the display of computing device 2 that displays the image content generated by GPU 12. Display 8 may be a liquid crystal display (LCD), an organic light emitting diode display (OLED), a cathode ray tube (CRT) display, a plasma display, or another type of display device.

Figure 2:
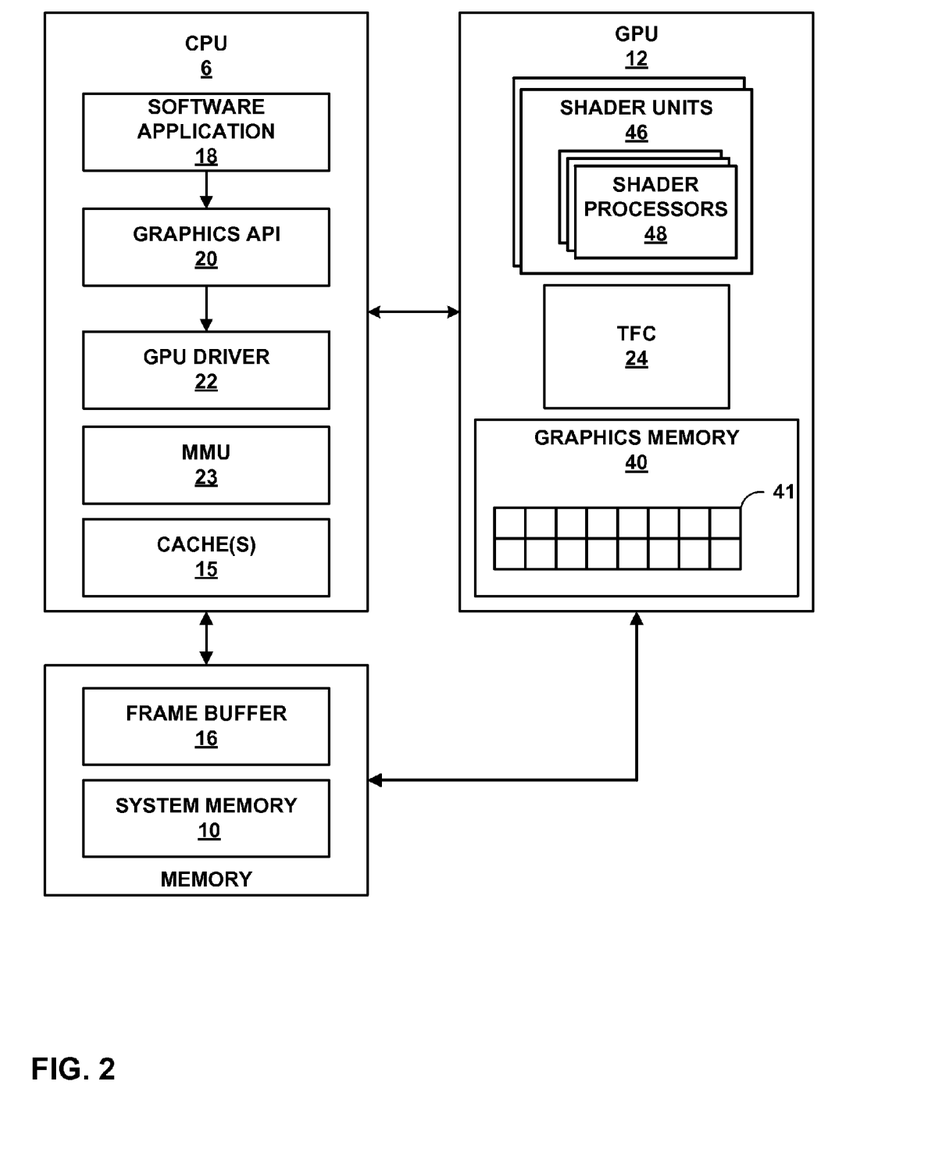
FIG. 2 is a block diagram illustrating example implementations of the processor, the GPU, and the system memory of FIG. 1 in further detail.

FIG. 2 is a block diagram illustrating example implementations of processor 6, GPU 12, and system memory 10 of FIG. 1 in further detail. As shown in FIG. 2, processor 6 may execute at least one software application 18, graphics API 20, GPU driver 22, and memory management unit (MMU) 23, each of which may be one or more software applications or services. In some examples graphics API 20 and GPU driver 22 may be implemented as hardware units of CPU 6.

Memory available to processor 6 and GPU 12 may include system memory 10 and frame buffer 16. Frame buffer 16 may be a part of system memory 10 or may be separate from system memory 10. Frame buffer 16 may store rendered image data. MMU 23 may be hardware configured to handle requests for access to memory, such as system memory 10 or graphics memory 40, from CPU 6. For example, MMU 23 may handle memory access requests from software application 18. MMU 23 may perform translations of virtual memory addresses to physical memory addresses using one or more page tables or translation lookaside buffers (TLBs) to handle such memory access requests.

In some examples, processor 6 may include or have access to one or more caches 15, such as level one (L1) cache, level two (L2) cache, level three (L3) cache, and the like. One or more caches 15 may provide faster memory access to processor 6 relative to system memory 10 and may store copies of data from frequently accessed memory locations of system memory 10.

Software application 18 may be any application that utilizes the functionality of GPU 12. For example, software application 18 may be a graphical user interface (GUI) application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a GUI and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. For example, software application 18 may invoke GPU driver 22, via graphics API 20, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by software application 18 to GPU driver 22, GPU driver 22 may formulate one or more commands that specify one or more operations for GPU 12 to perform in order to render the primitive. When GPU 12 receives a command from CPU 6, a graphics processing pipeline may execute on shader processors 48 to decode the command and to configure a graphics processing pipeline to perform the operation specified in the command. For example, an input-assembler in the graphics processing pipeline may read primitive data and assemble the data into primitives for use by the other graphics pipeline stages in a graphics processing pipeline. After performing the specified operations, the graphics processing pipeline outputs the rendered data to frame buffer 16 associated with a display device.

Frame buffer 16 stores destination pixels for GPU 12. Each destination pixel may be associated with a unique screen pixel location. In some examples, frame buffer 16 may store color components and a destination alpha value for each destination pixel. For example, frame buffer 16 may store Red, Green, Blue, Alpha (RGBA) components for each pixel where the "RGB" components correspond to color values and the "A" component corresponds to a destination alpha value. Although frame buffer 16 and system memory 10 are illustrated as being separate memory units, in other examples, frame buffer 16 may be part of system memory 10.

In some examples, a graphics processing pipeline may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units 46 in GPU 12. Shader units 46 may be configured as a programmable pipeline of processing components. In some examples, shader unit 46 may be referred to as "shader processors" or "unified shaders," and may perform geometry, vertex, pixel, or other shading operations to render graphics. Shader units 46 may include shader processors 48, each of which may include one or more components for fetching and decoding operations, one or more ALUs for carrying out arithmetic calculations, one or more memories, caches, and registers.

GPU 12 may designate shader units 46 to perform a variety of shading operations such as vertex shading, hull shading, domain shading, geometry shading, pixel shading, and the like by sending commands to shader units 46 to execute one or more of a vertex shader stage, a hull shader stage, a domain shader stage, a geometry shader stage, and a pixel shader stage in a graphics processing pipeline. In some examples, GPU driver 22 may include a compiler configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, an OpenCL C kernel, etc. The compiled shader programs may include one or more instructions that control the operation of shader units 46 within GPU 12. For example, the shader programs may include vertex shader programs that may be executed by shader units 46 to perform the functions of a vertex shader stage, hull shader programs that may be executed by shader units 46 to perform the functions of a hull shader stage, domain shader programs that may be executed by shader unit 46 to perform the functions of a domain shader stage, geometry shader programs that may be executed by shader unit 46 to perform the functions of a geometry shader stage and/or pixel shader programs that may be executed by shader units 46 to perform the functions of a pixel shader. A vertex shader program may control the execution of a programmable vertex shader unit or a unified shader unit, and include instructions that specify one or more per-vertex operations.

Graphics memory 40 may include on-chip storage or memory that physically integrated into the integrated circuit of GPU 12. If graphics memory 40 is on-chip, GPU 12 may be able to read values from or write values to graphics memory 40 more quickly than reading values from or writing values to system memory 10 via a system bus.

GPU 12 may also include transparent format converter (TFC) 24. TFC 24 may be hardware that enables CPU 6 or any other processing cores that do not support the pixel format according to which pixel data 41 is stored in graphics memory 40 to view pixel data 41 stored in graphics memory 40 as if pixel data 41 is stored in graphics memory 40 according to a pixel format that is supported by CPU 6. In other words, CPU 6, through TFC 24, can read and write pixel data 41 stored in graphics memory 40 in a pixel format that it supports. For example, if pixel data 41 is stored in graphics memory 40 in a tiled pixel format, and if CPU 6 supports a linear pixel format, such as NV12, TFC 24 may provide to CPU 6 a linear-based view of pixel data 41 such that pixel data 41 appears to CPU 6 to be arranged in a linear pixel format, such as NV 12, that is supported by CPU 6. TFC 24 may translate any writes by CPU 6 to pixel data 41 according to a pixel format supported by CPU 6 back to the pixel format in which it is stored in graphics memory 40. TFC 24 therefore enables CPU 6 to treat pixel data 41 as if it was in a pixel format supported by CPU 6, so that CPU 6 may read and write to pixel data 41 according to a pixel format supported by CPU 6 while pixel data 41 is stored in graphics memory 40 in a pixel format not supported by CPU 6.

In accordance with aspects of the present disclosure, TFC 24 may determine that a request by CPU 6 for pixel data 41 stored in graphics memory 40 is indicative of a request for pixel data 41 in a first data format. TFC 24 may retrieve pixel data 41 in a second data format from graphics memory 40 based at least in part on the request for pixel data 41 in graphics memory 40. TFC 24 may convert the retrieved pixel data 41 from the second data format to the first data format. TFC 24 may store the converted pixel data 41 in the first data format into a memory, such as a cache, that is accessible by processor 6.

In some examples, TFC 24 may be specific hardware logic that is included in GPU 12. In some other examples, TFC 24 may include shader code that is executed by shader processors 48 of shader units 46. In other examples, TFC 24 may be hardware that is included in computing device 2 but is not specifically included in GPU 12. For example, TFC 24 may be incorporated into CPU 6, or may be a standalone hardware component that is separate from CPU 6 and GPU 12.

Figure 3:
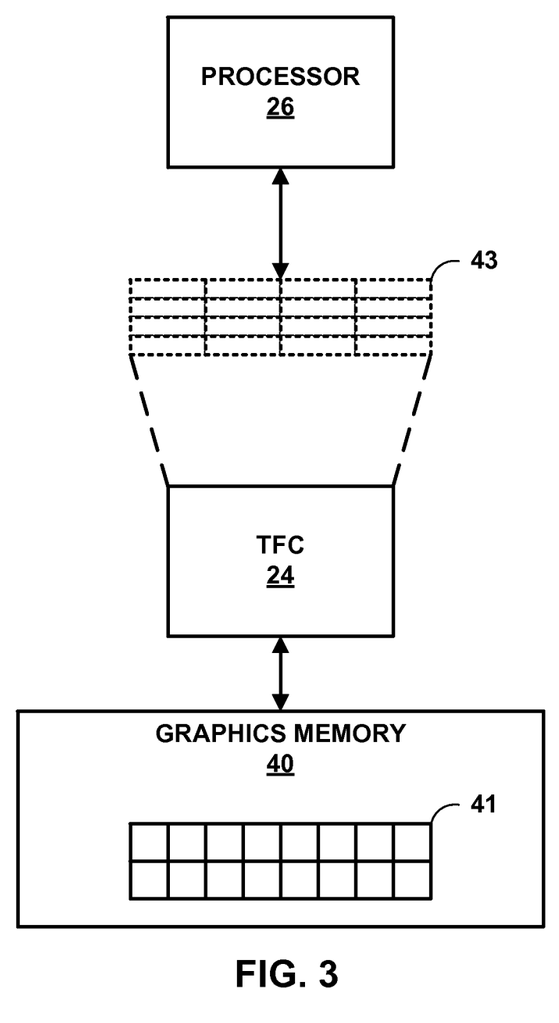
FIG. 3 is a conceptual diagram illustrating an example functionality of the TFC of FIG. 2.

FIG. 3 is a block diagram illustrating an example functionality of TFC 24 of FIG. 2. As shown in FIG. 3, graphics memory 40 may store pixel data 41 that follow a tile-based pixel format. Processor 26 may be a processing core that is not capable of reading from and writing to the tile-based pixel format. For example, processor 26 may support linear pixel formats but not tile-based pixel formats. To enable processor 26 to read and write to pixel data 41, TFC 24 may provide view 43 of pixel data 41 stored in graphics memory 40 to processor 26 that is independent of how pixel data 41 is stored in graphics memory 40. View 43 may represent pixel data 41 in a pixel format that is supported by processor 26, such that from processor 26's viewpoint, graphics data is laid out in view 43 according to a pixel format that processor 26 supports, such as YUV, NV12, and the like. TFC 24 therefore enables processor 26 to read and write to pixel data 41 as if pixel data 41 is stored in graphics memory 40. TFC 24 may receive the read and write requests from processor 26 and may translate the read and write requests to appropriate read and write requests for the tile-based pixel format of pixel data 41.

TFC 24 presenting view 43 to processor 26 may include presenting a colored aperture to processor 26. A colored aperture may be an address range, either physical and/or virtual, which may be used to access memory with a specific target pixel format. For example, TFC 24 may present a virtual address range to processor 26 that processor 26 may make memory accesses to in order to access pixel data 41 in a pixel format that is supported by processor 26. TFC 24 may be able to determine that processor 26 is attempting to read from or write to pixel data 41 in a pixel format that is supported by processor 26 based on the virtual address of the memory request from processor 26 if TFC 24 determines that processor 26 is attempting to read from or write to the colored aperture. If multiple different software applications and/or different processors requests access to pixel data 41, TFC 24 may provide a unique color aperture for each of the different software applications and/or different processors that do not overlap. In this way, TFC 24 may be able to determine the requesting software application and/or processor as well as the pixel formats supported by those software applications and/or processors based at least in part on the virtual address included in the request for access for pixel data 41 from those software applications and/or processors.

Figure 4:
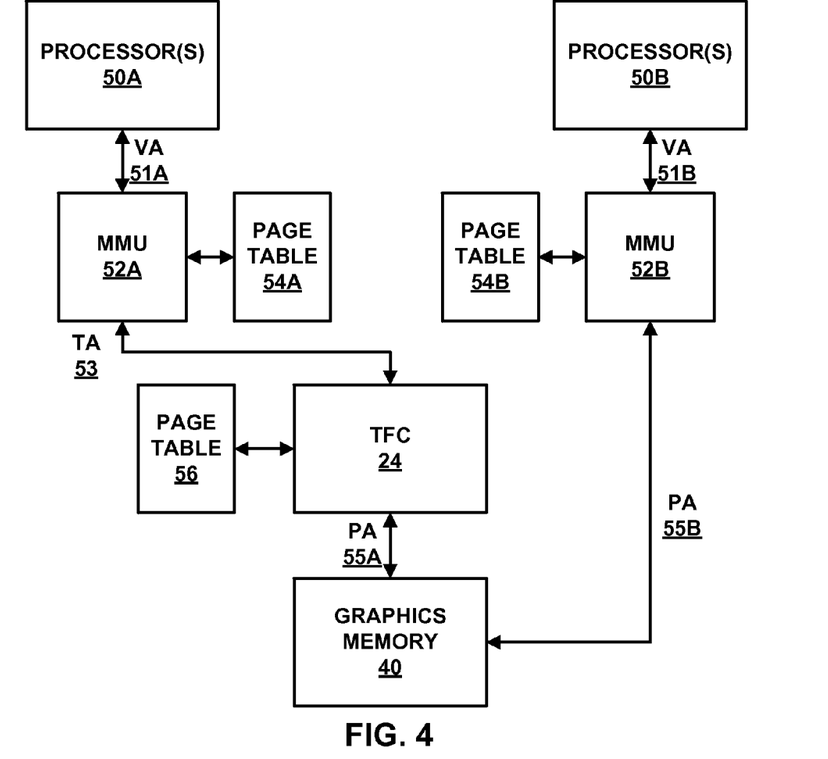
FIG. 4 is a block diagram illustrating an example implementation of the TFC of FIG. 2 in further detail.

FIG. 4 is a block diagram illustrating an example implementation of TFC 24 of FIG. 2 in further detail. As shown in FIG. 4, processor 50A and processor 50B may each request access to pixel data 41 stored in graphics memory 40. While processor 50A may not support or have knowledge of the underlying pixel format of pixel data 41 stored in graphics memory 40 for which processor 50A is requesting access, processor 50B may support and/or have knowledge of the underlying pixel format of pixel data 41 stored in graphics memory 40 for which processor 50B is requesting access. Examples of processor 50A may include CPU 6 as well as any other processing hardware that does not support or have knowledge of the pixel format of pixel data 41 stored in graphics memory 40. More specifically, if processor 50A is CPU 6, software application 18 executing on CPU 6 may request access to pixel data 41 stored in graphics memory 40. Examples of processor 50B may include GPU 12, shader processors 48, video encoders, video decoders, display processors, displays, digital signal processors (DSPs), camera processors, video processors, and the like that support and/or have knowledge of the pixel format of pixel data stored in graphics memory 40.

Processors 50A and 50B may each request access to pixel data 41 stored in graphics memory 40. As discussed above, pixel data 41 that processors 50A and 50B requests access to may be arranged according to a particular pixel format that is supported by processor 50B but is not supported by processor 50A.

Processor 50A may make a request for data from virtual address 51A and processor 50B may make a request for data from virtual address 51B. MMU 52A may use page table 54A to handle the request for data from processor 50A to convert virtual address 51A to translated address 53. For example, if processor 50A is CPU 6, MMU 52A may be MMU 23. MMU 52A may convert virtual address 51A to translated address 53, including appending one or more color bits in front of virtual address 51A, such that one or more upper bits of translated address 53 includes the one or more color bits, followed by virtual address 51A. The color bits may indicate to TFC 24 the pixel format supported by processor 50A. For example, in a 64-bit addressable space, virtual address 51A may not take up all 64 bits. Thus, MMU 52A may be able to concatenate one or more color bits to virtual address 51A to produce a translated address 53 that is less than or equal to 64 bits. Similarly, MMU 52B may use page table 54B to handle the request for data from processor 50B to look up physical address 55B using virtual address 51B. Because processor 50B supports the pixel format in which pixel data 41 is stored in graphics memory 40, MMU 52B can translate virtual address 51B directly to physical address 55B, which is a physical address of the requested data in graphics memory 40, instead of translating virtual address 51B to a translated address.

TFC 24 may receive translated address 53 and may determine, based at least in part on using translated address 53 to index into page table 56, physical address 55A that indicates the location of pixel data 41 in graphics memory 40 requested by processor 50A. TFC may retrieve pixel data 41 in graphics memory 40 based at least in part on physical address 55A and may translate the retrieved pixel data 41 from the pixel format according to which pixel data 41 was stored in graphics memory 40 into a pixel format that is supported by processor 50A. Translating the retrieved pixel data 41 may include uncompressing pixel data 41, rearranging the pixel information according to the pixel format supported by processor 50A, and the like. TFC 24 may return the converted pixel data 41 back to processor 50A, such as by storing the converted pixel data 41 into one or more caches in processor 50A (e.g., one or more caches 15).

Processor 50A may read and write to pixel data 41 stored in its one or more caches according to the pixel format supported by processor 50A. In response to a cache flush, which is when processor 50A evicts pixel data 41A from its one or more caches, TFC 24 may receive pixel data 41 from processor 50A along with translated address 53 that is translated based at least in part on virtual address 51A. TFC 24 may convert pixel data 41 back to the pixel format in which it is stored in graphics memory 40, including rearranging the pixel information into the pixel format in which pixel data 41 is stored in graphics memory 40 and compressing the pixel information according to the pixel format in which pixel data 41 is stored in graphics memory 40. TFC 24 may also translate the translated address 53 into physical address 55A using page table 56, and may store pixel data 41 to graphics memory 40 at physical address 55A.

Figure 5:
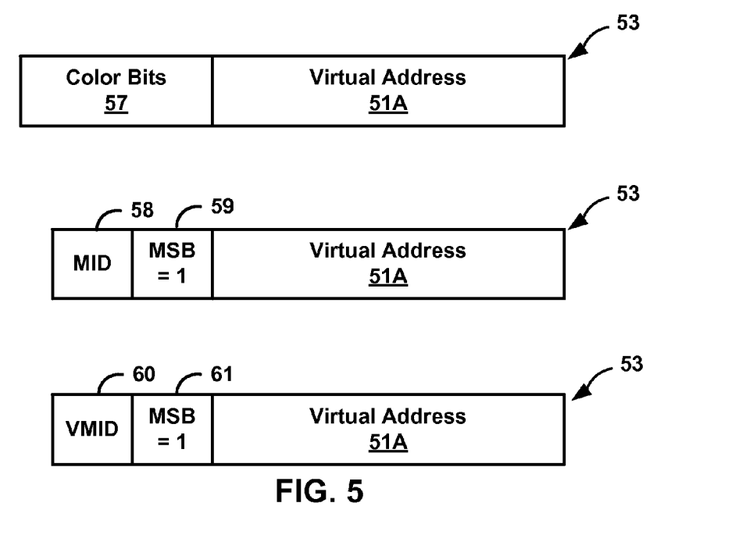
FIG. 5 is a block diagram illustrating example formats of the translated address of FIG. 4.

FIG. 5 is a block diagram illustrating example formats of translated address 53 of FIG. 4. As shown in FIG. 5, translated address 53 may include one or more significant bits that identify the processor that is requesting access to pixel data 41 as well as identify the one or more pixel formats supported by the processor. Translated address 53 may include the one or more significant bits concatenated to virtual address 51. In one example, the one or more most significant bits of translated address 53 may include color bits 57. Color bits 57 may be one or more bits that specify the pixel format supported by the requesting processor. In another example, the one or more most significant bits of translated address 53 may include master ID 58 that identifies the requesting processor as well as bit 59 that is set to 1 if the most significant bit of translated address 53 is 1. In another example, the one or more most significant bits of translated address 53 may include virtual machine ID 60 that identifies the requesting processor as being within a group of processors having similar access permissions as well as bit 61 that is set to 1 if the most significant bit of translated address 53 is 1.

Figure 6:
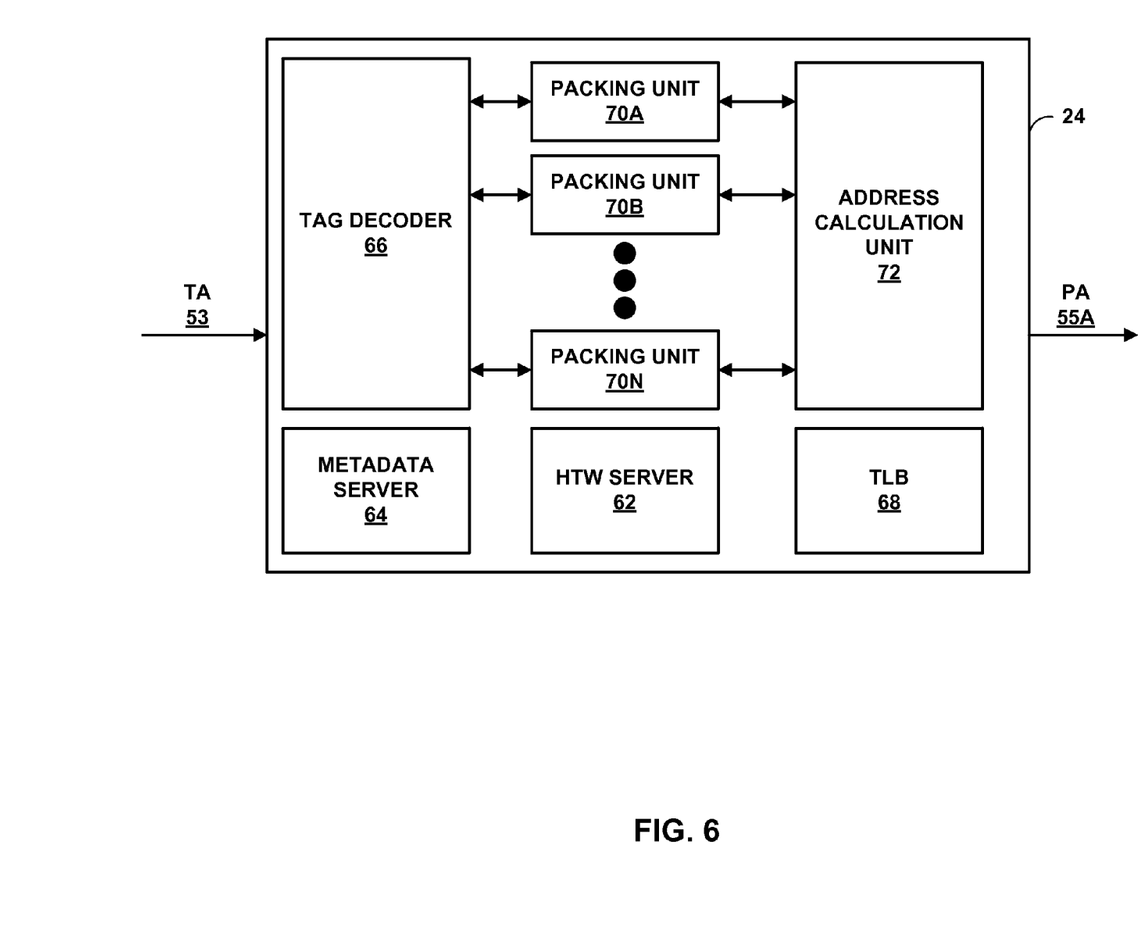
FIG. 6 is a block diagram illustrating an example implementation of the TFC of FIG. 2 in further detail.

FIG. 6 is a block diagram illustrating an example implementation of TFC 24 of FIG. 2 in further detail. As shown in FIG. 5, TFC 24 may include tag decoder 66, translation lookaside buffer (TLB) 68, packing units 69A-69N ("packing units 69"), and address calculation unit 67. TFC 24 may also include metadata server 64 and hardware table walker (HTW) server 62.

As discussed above, TFC 24 may translate translated address 53 to physical address 55A. TFC may also convert between pixel formats supported by a processor and pixel formats of pixel data 41 stored in graphics memory 40. Tag decoder 66 may decode translated address 53 to determine the information included in translated address 53, such as the pixel format supported by a processing core (e.g., processor 50A) that is attempting to access pixel data 41 in graphics memory 40.

Metadata server 64 may determine one or more view definitions for translated address 53 received by TFC 24. A view definition for translated address 53 may include information regarding processor 50A that sent the request for pixel data 41 as well as information regarding pixel data 41 requested through translated address 53. The one or more view definitions may include the status of the requested pixel data 41, the start address of the requested pixel data 41, the length of the requested pixel data 41, the target pixel format supported by requesting processor 50A, the tile width and length of the requested pixel data 41, the stride of the requested pixel data 41, and the like, as well as any other necessary data that may be required to convert the pixel data 41 into a pixel format that is supported by the requesting processor 50A. In some example, metadata server 64 may include one or more view definitions for every translated address 53 it receives.

Address calculation unit 67 may determine physical address 55A from translated address 53. TLB 68 may cache one or more translated address to physical address translations. Address calculation unit 67 may query TLB 68 to determine if TLB 68 has cached physical address 55A of translated address 53. If TLB 68 has cached physical address 55A of translated address 53, TFC 24 may access pixel data 41 at physical address 55A based on the view definitions for pixel data 41 provided by metadata server 64.

If TLB has not cached physical address 55A of translated address 53, address calculation unit 67 may strip the color bits of translated address 53 and may provide the stripped translated address to HTW server 62 to determine physical address 55A of translated address 53. HTW server 62 may be hardware for accessing one or more page tables (e.g., page table 54A and/or page table 56) to determine physical address 55A of translated address 53. In response to HTW server 62 determining physical address 55A of translated address 53, TFC 24 may access pixel data 41 at physical address 55A based on the view definitions for pixel data 41 provided by metadata server 64.

Packing units 69 may translate between the pixel formats supported by a requesting processing core and the pixel format of pixel data 41 stored in graphics memory 40. Packing units 69 may perform color conversion, tiling, de-tiling, compression, de-compression, and the like to convert between pixel formats. In some examples, packing units 69 may include fixed function hardware. In other examples, the functionality of packing units 69 may be implemented via other means such as via GPU 12, shader units 46, specialized digital signal processors, and the like. In some examples, the entire functionality of TFC 24 may be implemented via shader code executing on shader units 46.

Figure 7:
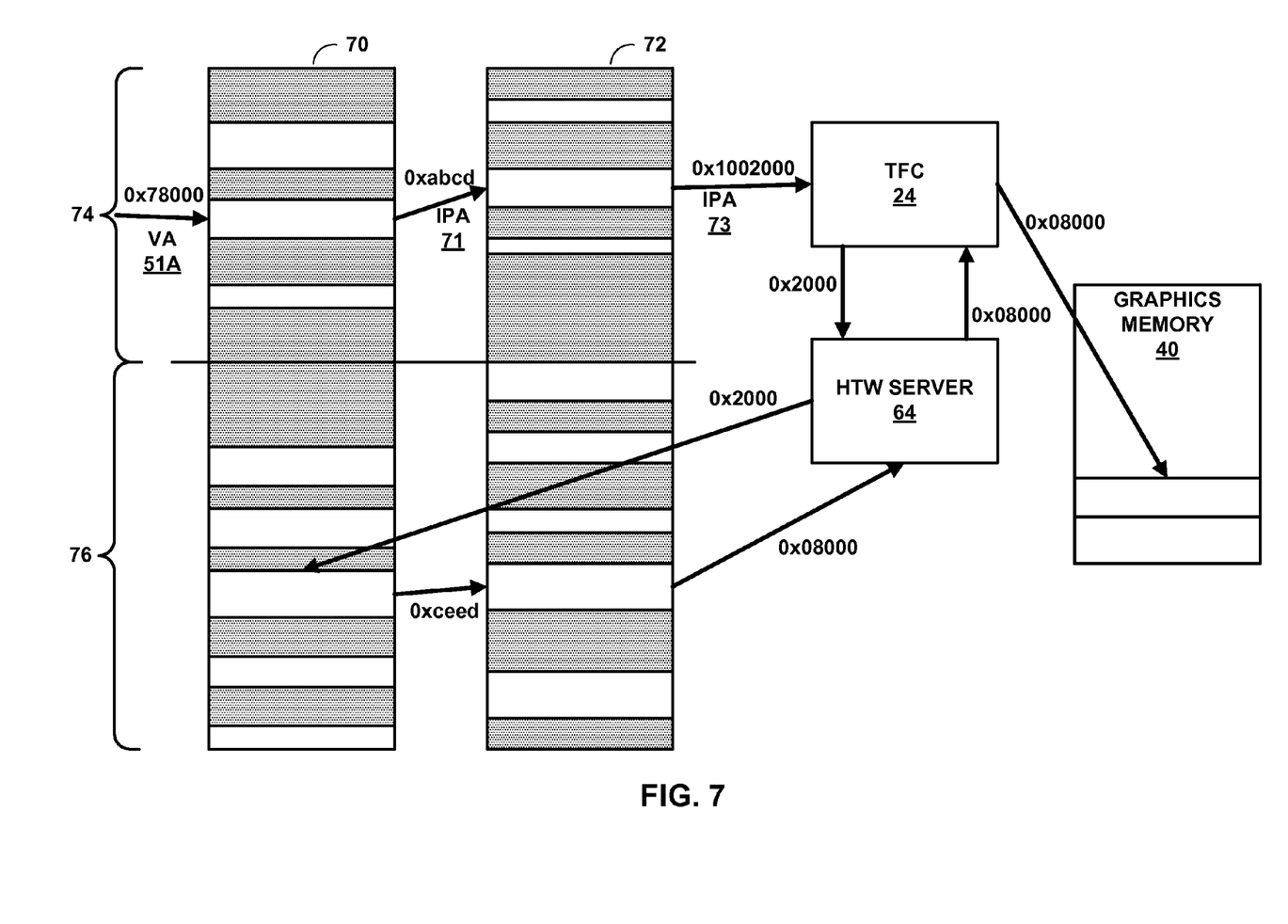
FIG. 7 is a block diagram illustrating the TFC of FIG. 2 utilizing a two-level page table mapping to translate an example virtual address into an example physical address.

FIG. 7 is a block diagram illustrating TFC 24 of FIG. 2 utilizing a two-level page table mapping to translate an example virtual address into an example physical address. Because a single-level page table may typically be managed by a high-level operating system (HLOS), a two-level page table may enable TFC 24 to hide the translation of addresses and the conversion of pixel formats from the HLOS, such that it may appear to the HLOS that an MMU is simply translating a virtual address to a physical address using a single page table.

As shown in FIG. 7, MMU 52A may be a two-level MMU that utilizes a two-stage page table comprising page table 70 and page table 72. The HLOS may manage page table 70 while a hypervisor or virtual machine monitor (VMM) may manage page table 72. As discussed above, because a hypervisor or VMM may manage the second stage mapping using page table 72, such second level mapping may be hidden from the HLOS.

Page tables 70 and 72 may have dedicated memory segments where software application 18 may be able to map normal pages for pixel format conversion. MMU 52A may also manage user address space and kernel address space using page table 70 and 72. The user address space may be accessible by software applications running on the HLOS while the kernel address space may be accessible by low-level privileged code such as the kernel. In this way, the kernel address space may be protected from access by unprivileged software applications. Page tables 70 and 72 may include user address space portion 74 for translating user address space virtual addresses and kernel address space portion 76 for translating kernel address space virtual addresses.

In the example of FIG. 7, virtual address 51A may be 0x7800, which may be in the user address space. MMU 52A may utilize virtual address 51A to index into page table 70 to translate virtual address 51A into intermediate physical address 71 of 0xabcd. IPA 71 may be virtual address 51A concatenated with color bits, such as color bits 57, MMU 52A may use IPA 71 to index into page table 72 to translate intermediate physical address 71 into intermediate physical address 73 of 0x1002000. IPA 73 may retain the color bits of IPA 71 in its one or more most significant bits. Intermediate physical address 73 may be the same as translated address 53 of FIG. 4.

TFC 24 may strip the color bits 0x1000000 from physical address 73 of 0x1002000 and pay provide the resulting address 0x2000 to HTW server 62 to determine physical address 55A. Because the resulting address 0x2000 may be in the kernel address space, HTW server 62 may utilize the resulting address 0x2000 to index into kernel address space portion 76 of page table 70 to result in an address of 0xceed. HTW server 62 may further utilize the address of 0xceed to index into kernel address space portion 76 of page table 72 to result in physical address 55A of 0x0800. HTW server 62 may provide physical address 55A of 0x0800 into TFC 24, and TFC may access graphics memory 40 at physical address 55A of 0x0800. In this way, kernel address space portion 76 of page tables 70 and 72 may act as page table 56 of FIG. 4 for converting translated address 53 into physical address 55A.

By utilizing the kernel address space and kernel address space portion 76 of page tables 70 and 72 to determine physical address 55A, TFC 24 may use the security regime imposed by a processor, such as CPU 6, to perform the translation of virtual address 51A to physical address 55A. The security regime may also enable TFC 24 to be memory efficient in creating multiple color apertures for multiple software applications and/or multiple processing cores.

Figure 8:
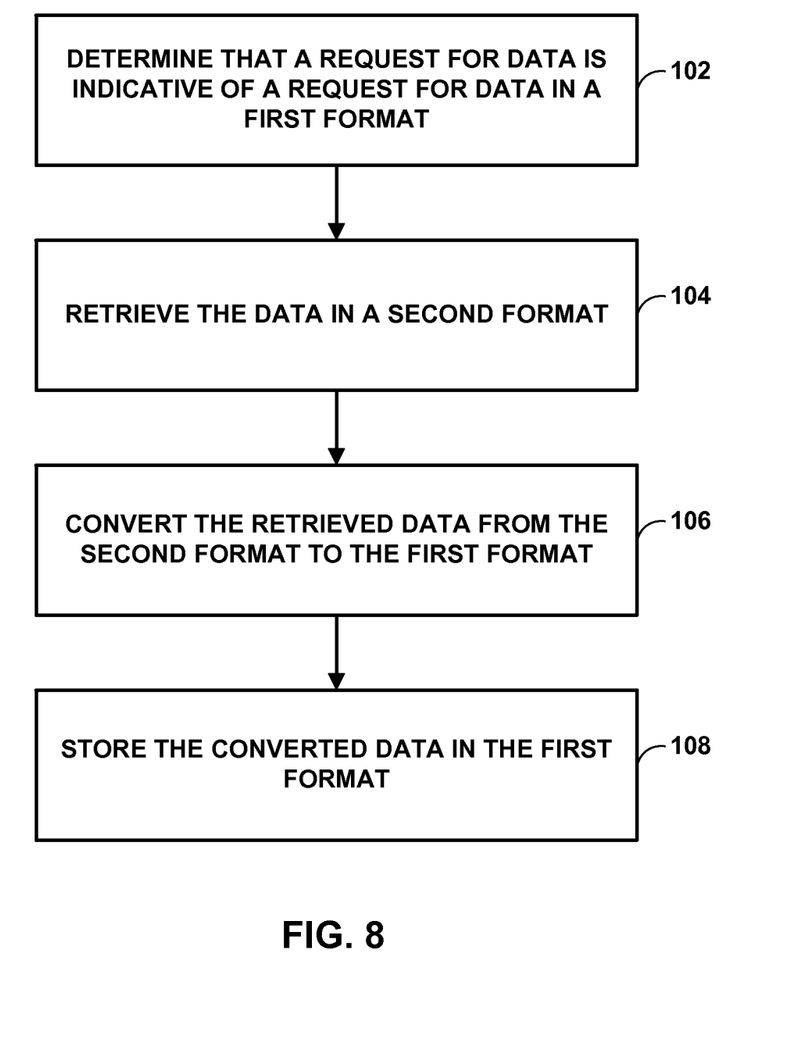
FIG. 8 is a flowchart illustrating a process for transparently converting pixel formats.

FIG. 8 is a flowchart illustrating a process for transparently converting pixel formats. As shown in FIG. 8, the process may include determining, by TFC 24, that a request by at least one processor for data stored in a first data buffer is indicative of a request for the data in a first data format (102). The process may further include retrieving, by TFC 24, the data in a second data format from the first data buffer based at least in part on the request for data stored in the first data buffer (104). The process may further include converting, by TFC 24, the retrieved data from the second data format to the first data format (106). The process may further include storing, by TFC 24, the converted data in the first data format into a second data buffer that is accessible by the at least one processor (108).

In some examples, the request by the at least one processor for data stored in the first data buffer includes a request for data stored at a virtual address 51A, and retrieving, by TFC 24, data in a second data format from the first data buffer further comprises retrieving, by TFC 24, the data in the second data format from the first data buffer at a physical address 55A that corresponds to the virtual address. In some examples, the process may further include determining, by MMU 52A, a translated address 53 based at least in part on the virtual address 51A, and determining, by TFC 24, the physical address 55A based at least in part on the translated address 53.

In some examples, one or more most significant bits of the translated address 53 comprises one or more color bits, and wherein the one or more color bits indicate at least a pixel format supported by the one or more processors. In some examples, determining the translated address 53 further includes determining, by MMU 52A, the one or more color bits based at least in part on the virtual address 51A. In some examples, the process may further include determining, by MMU 52A using a first level page table 70, an intermediate physical address 71 based at least in part on the virtual address 51A, and determining, by MMU 52A using a second level page table 72, the translated address 53 based at least in part on the intermediate physical address 71. In some examples, determining, by TFC 24, the physical address 55A based at least in part on the translated address 53 further includes determining, by TFC 24, the physical address 55A based at least in part on a kernel address space portion 76 of one or more page tables 70 and 72.

In some examples, the second data buffer comprises a cache for the at least one processor. In some examples, the data comprises pixel data 41, the first data format comprises a first pixel format, and the second data format comprises a second pixel format. In some examples, the process further includes receiving, by TFC 24 from the at least one processor, second data in the first data format, converting, by TFC 24, the second data from the first data format to the second data format, and storing, by TFC 24, the converted data in the second data format into the first data buffer.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the present disclosure have been described. These and other aspects are within the scope of the following claims.

The invention claimed is:

1. A method for pixel processing, comprising:
receiving, by a graphics processing unit (GPU) from at least one processor that supports a first data format, a request for data stored in a first data buffer, wherein the request comprises a virtual address of the data;
determining, by a memory management unit (MMU) of the GPU, one or more color bits that indicate the first data format supported by the at least one processor based at least in part on the virtual address of the data being within a virtual address range associated with the first data format;
determining, by the MMU, a translated address made up of the virtual address of the data concatenated with the one or more color bits;
retrieving, by a transparent format converter (TFC), the data in a second data format from the first data buffer at a physical address that corresponds to the virtual address in the translated address;
converting, by the TFC, the retrieved data from the second data format to the first data format indicated by the one or more color bits in the translated address; and
storing, by the TFC, the converted data in the first data format into a second data buffer that is accessible by the at least one processor.

2. The method of claim 1, wherein determining the one or more color bits that indicate the first data format supported by the at least one processor based at least in part on the virtual address of the data being within the virtual address range associated with the first data format further comprises:
determining, by the MMU using a first level page table, an intermediate physical address based at least in part on the virtual address; and
determining, by the MMU using a second level page table, the translated address based at least in part on the intermediate physical address.

3. The method of claim 1, further comprising:
determining, by the TFC, the physical address based at least in part on a kernel address space portion of one or more page tables.

4. The method of claim 1, wherein the second data buffer comprises a cache for the at least one processor.

5. The method of claim 1, wherein:
the data comprises pixel data;
the first data format comprises a first pixel format; and
the second data format comprises a second pixel format.

6. The method of claim 1, further comprising:
receiving, by the TFC from the at least one processor, second data in the first data format;
converting, by the TFC, the second data from the first data format to the second data format; and
storing, by the TFC, the converted data in the second data format into the first data buffer.

7. A computing device comprising:
a first data buffer;
a second data buffer;
at least one processor that supports a first data format;
a graphics processing unit (GPU) configured to:
receive a request by the at least one processor for data stored in the first data buffer, wherein the request comprises a virtual address of the data;
a memory management unit (MMU) of the GPU configured to:
determine one or more color bits that indicate the first data format supported by the at least one processor based at least in part on the virtual address of the data being within a virtual address range associated with the first data format; and
determine a translated address made up of the virtual address of the data concatenated with the one or more color bits; and
determine a physical address that corresponds to the virtual address based at least in part on the translated address;
a transparent format converter (TFC) of the GPU configured to:
retrieve the data in a second data format from the first data buffer at a physical address that corresponds to the virtual address in the translated address;
convert the retrieved data from the second data format to the first data format indicated by the one or more color bits in the translated address; and
store the converted data in the first data format into the second data buffer that is accessible by the at least one processor.

8. The computing device of claim 7 wherein the MMU is further configured to:
determine, using a first level page table, an intermediate physical address based at least in part on the virtual address; and
determine, using a second level page table, the translated address based at least in part on the intermediate physical address.

9. The computing device of claim 7, wherein the TFC is further configured to:
determine the physical address based at least in part on a kernel address space portion of one or more page tables.

10. The computing device of claim 7, wherein the second data buffer comprises a cache for the at least one processor.

11. The computing device of claim 7, wherein:
the data comprises pixel data;
the first data format comprises a first pixel format; and
the second data format comprises a second pixel format.

12. The computing device of claim 7, wherein the TFC is further configured to:
receive from the at least one processor, second data in the first data format;
convert the second data from the first data format to the second data format; and
store the converted data in the second data format into the first data buffer.

13. An apparatus comprising:
means for receiving a request by at least one processor that supports a first data format for data stored in a first data buffer, wherein the request comprises a virtual address of the data;
means for determining one or more color bits that indicate the first data format supported by the at least one processor based at least in part on the virtual address of the data being within a virtual address range associated with the first data format;
means for determining a translated address made up of the virtual address of the data concatenated with the one or more color bits;
means for retrieving the data in a second data format from the first data buffer at a physical address that corresponds to the virtual address in the translated address;
means for converting the retrieved data from the second data format to the first data format indicated by the one or more color bits in the translated address; and
means for storing the converted data in the first data format into a second data buffer that is accessible by the at least one processor.

14. A non-transitory computer-readable medium comprising instructions for causing a programmable processor to:
receive a request for data stored in a first data buffer, wherein the request comprises a virtual address of the data;
determine one or more color bits that indicate the first data format supported by the at least one processor based at least in part on the virtual address of the data being within a virtual address range associated with the first data format;
determine a translated address made up of the virtual address of the data concatenated with the one or more color bits;
retrieve the data in a second data format from the first data buffer at a physical address that corresponds to the virtual address in the translated address;
convert the retrieved data from the second data format to the first data format indicated by the one or more color bits in the translated address; and
store the converted data in the first data format into a second data buffer that is accessible by the at least one processor.

* * * * *